(12) United States Patent
Fujii

(10) Patent No.: US 10,830,956 B2
(45) Date of Patent: Nov. 10, 2020

(54) OPTICAL FIBER ARRAY AND OPTICAL MEASUREMENT DEVICE

(71) Applicant: SUMITOMO ELECTRIC INDUSTRIES, LTD., Osaka (JP)

(72) Inventor: Kosuke Fujii, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/541,966

(22) Filed: Aug. 15, 2019

(65) Prior Publication Data

US 2020/0073057 A1 Mar. 5, 2020

(30) Foreign Application Priority Data

Aug. 31, 2018 (JP) ................. 2018-163328

(51) Int. Cl.
| | |
|---|---|
| *G02B 6/00* | (2006.01) |
| *G02B 6/36* | (2006.01) |
| *G02B 6/024* | (2006.01) |
| *G02B 6/27* | (2006.01) |
| *G01M 11/00* | (2006.01) |
| *G02F 1/21* | (2006.01) |
| *G02B 6/04* | (2006.01) |

(52) U.S. Cl.
CPC ....... *G02B 6/3616* (2013.01); *G01M 11/3136* (2013.01); *G01M 11/3181* (2013.01); *G02B 6/024* (2013.01); *G02B 6/04* (2013.01); *G02B 6/2706* (2013.01); *G02F 1/218* (2013.01); *G02F 2001/212* (2013.01)

(58) Field of Classification Search
CPC ........ G02B 6/2706; G02B 6/024; G02B 6/00; G02B 6/04; G02F 1/218; G02F 2001/212
See application file for complete search history.

(56) References Cited

U.S. PATENT DOCUMENTS

| | | | | |
|---|---|---|---|---|
| 6,021,141 | A | * | 2/2000 | Nam .................... H01S 5/02 372/102 |
| 2018/0224605 | A1 | * | 8/2018 | Painchaud ........... G02B 6/1228 |

FOREIGN PATENT DOCUMENTS

JP 07-199002 4/1995

* cited by examiner

*Primary Examiner* — Jennifer Doan
(74) *Attorney, Agent, or Firm* — Smith, Gambrell & Russell, LLP.

(57) ABSTRACT

An optical fiber array includes a support, a single-mode optical fiber and a plurality of multimode optical fibers, the single-mode optical fiber and the multimode optical fibers being arranged on the support, and a polarizing plate provided on an end face of the support, wherein the single-mode optical fiber has polarization maintaining characteristics, an end face of the single-mode optical fiber and end faces of the multimode optical fibers face the end face of the support, and the polarizing plate covers the end faces of the multimode optical fibers.

12 Claims, 3 Drawing Sheets

OPTICAL FIBER ARRAY AND OPTICAL MEASUREMENT DEVICE

CROSS-REFERENCE TO RELATED APPLICATION

This application is based upon and claims the benefit of priority of the prior Japanese Patent Application No. 2018-163328, filed on Aug. 31, 2018, the entire contents of which are incorporated herein by reference.

BACKGROUND (i) Technical Field

The present invention relates to an optical fiber array and an optical measurement device.

(ii) Related Art

Japanese Patent Application Publication No. H07-199002 discloses a technique for connecting a multimode optical fiber array to an edge of a single-mode optical fiber array.

SUMMARY

The intensity of light or the like emitted from a light modulation device is measured in some cases. In such a case, laser light having a specific polarization plane and a single mode enters the light modulation device, and the laser light having the specific polarization plane in light emitted from the light modulation device is transferred to a measuring instrument. However, in the above described multimode optical fibers, polarized waves and modes might coexist, and therefore, it is difficult for light to enter and exit the light modulation device when measurement is carried out. In view of this, the present invention enables propagation of light having a specific polarization plane and a single mode, and provide an optical fiber array and an optical measurement device in which light having the specific polarization plane can propagate.

According to an aspect of the present invention, there is provided an optical fiber array comprising: a support; a single-mode optical fiber and a plurality of multimode optical fibers, the single-mode optical fiber and the multi-mode optical fibers being arranged on the support; and a polarizing plate provided on an end face of the support, wherein the single-mode optical fiber has polarization maintaining characteristics, an end face of the single-mode optical fiber and end faces of the multimode optical fibers face the end face of the support, and the polarizing plate covers the end faces of the multimode optical fibers.

According to another aspect of the present invention, there is provided an optical measurement device comprising: the above-mentioned optical fiber array; a distance adjusting unit that adjusts a distance between the end face of the optical fiber array and a light modulation device; a laser source connected to the single-mode optical fiber of the optical fiber array; and an intensity measuring unit that is connected to the multimode optical fibers of the optical fiber array, and measures an intensity of light emitted from the light modulation device, wherein laser light emitted from the laser source enters the light modulation device through the single-mode optical fiber, and laser light emitted from the light modulation device enters the intensity measuring unit through the polarizing plate and the multimode optical fibers of the optical fiber array.

DETAILED DESCRIPTION

Figure 1:
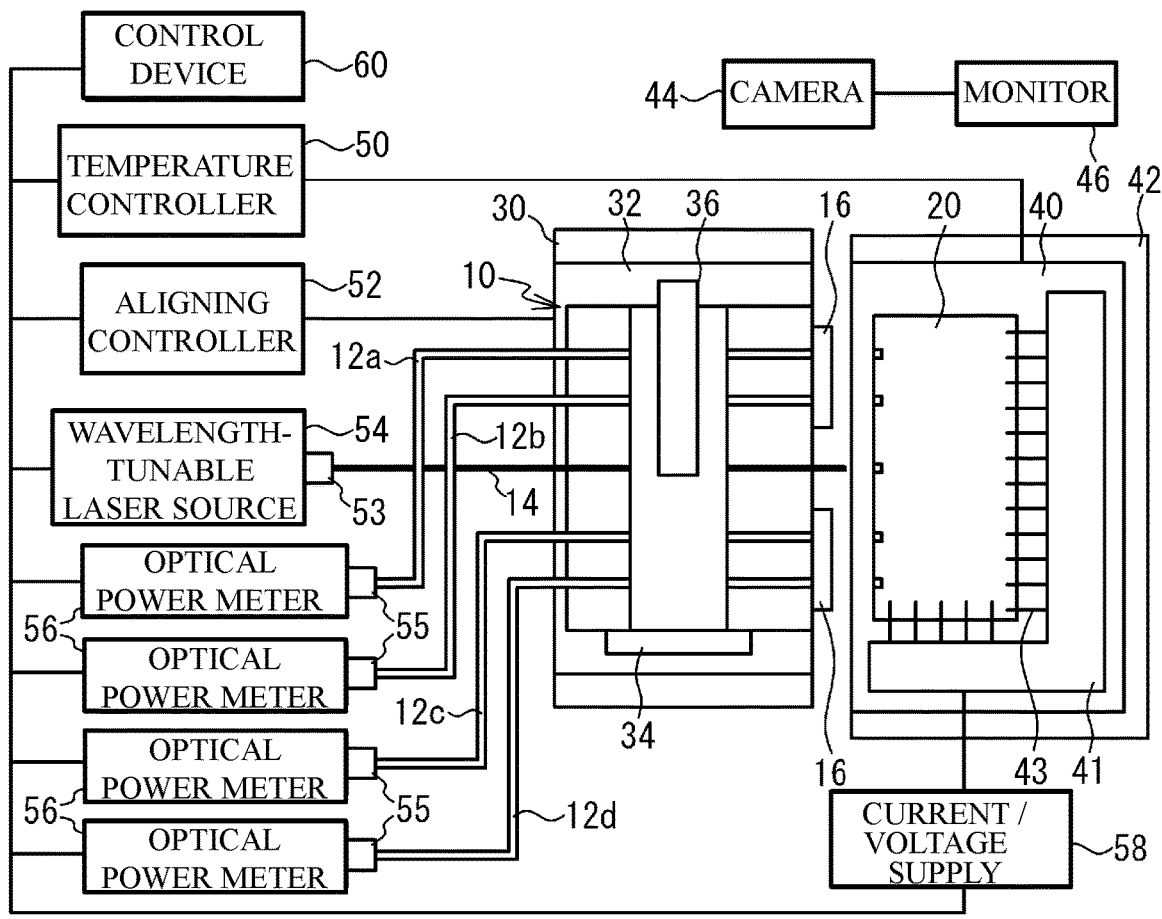
FIG. 1 is a block diagram showing an example of an optical measurement device.

Description of Embodiments of the Present Invention

First of all, the contents of embodiments of the present invention will be listed and described.

The present invention is (1) an optical fiber array including: a support; a single-mode optical fiber and a plurality of multimode optical fibers, the single-mode optical fiber and the multimode optical fibers being arranged on the support; and a polarizing plate provided on an end face of the support, wherein the single-mode optical fiber has polarization maintaining characteristics, an end face of the single-mode optical fiber and end faces of the multimode optical fibers face the end face of the support, and the polarizing plate covers the end faces of the multimode optical fibers. With the single mode optical fiber, it is possible to send a light having a specific polarization plane and a single mode light. And, the light having passed through the polarizing plate enters the multimode optical fibers. Therefore, the light having the specific polarization plane can be sent via the multimode optical fiber.

(2) A core diameter of the multimode optical fibers may not be necessarily smaller than 100 μm and not greater than 500 μm. The optical fiber array is spaced from a light modulation device because the polarizing plate is provided on the end face of the optical fiber array. The multimode optical fibers of which a core diameter is larger than that of the single mode optical fiber is used in order to receive an emitted light diffused from the light modulation device. Therefore, coupling loss is reduced.

(3) The end faces of the multimode optical fibers may be located in a same plane as the end face of the support. Coupling loss is reduced because the multimode optical fibers receive the light entering the end face thereof. It is possible to change polarizing condition of the light because the polarizing plate is provided on the end face of the support.

(4) The single-mode optical fiber may be a lensed fiber, and the end face of the single-mode optical fiber may protrude outward from the end face of the support. The coupling loss is reduced, because the single mode optical fiber collects the light and the end face is closer to the light modulation device.

(5) At least two of the multimode optical fibers may be disposed on either side of the single-mode optical fiber. With the structure, it is possible to receive a plurality of lights emitted from the light modulation device.

(6) A thickness of the polarizing plate may not be necessarily smaller than 100 μm and not greater than 400 μm. It is possible to provide a polarizing plate between the optical fiber array and an outer device.

(7) An optical measurement device including: the above-mentioned optical fiber array; a distance adjusting unit that adjusts a distance between the end face of the optical fiber array and a light modulation device; a laser source connected to the single-mode optical fiber of the optical fiber array; and an intensity measuring unit that is connected to the multimode optical fibers of the optical fiber array, and measures an intensity of light emitted from the light modulation device, wherein laser light emitted from the laser source enters the light modulation device through the single-mode optical fiber, and laser light emitted from the light modulation device enters the intensity measuring unit through the polarizing plate and the multimode optical fibers of the optical fiber array. The light modulation device can receive an incident light via the single mode optical fiber. And the multimode optical fibers can extract the light emitted from the light modulation device.

DETAILS OF EMBODIMENTS OF THE PRESENT INVENTION

A description will be given embodiments of optical modulation devices of embodiments of the present invention, with drawings. The present invention is not limited to the specifically disclosed embodiments and variations but may include other embodiments and variations without departing from the scope of the present invention.

First Embodiment (Optical Measurement Device)

FIG. 1 is a block diagram showing an example of an optical measurement device 100. As shown in FIG. 1, the optical measurement device 100 includes an optical fiber array 10, an aligning stage 30, a temperature adjustment stage 40, an angle adjustment stage 42, a camera 44, a monitor 46, a temperature controller 50, an aligning controller 52, a wavelength-tunable laser source 54, four optical power meters 56, a current/voltage supply 58, and a control device 60.

The optical measurement device 100 is a device that evaluates a light modulation device 20 by emitting laser light onto the light modulation device 20 and extracting the light modulated by the light modulation device 20. As will be described later with reference to FIG. 2A, an inlet port and outlet ports are disposed in one surface of the light modulation device 20. Therefore, the optical fiber array 10 is made to face the surface of the light modulation device 20, and laser light is then transmitted.

Single-mode laser light having a specific polarization plane is emitted onto the light modulation device 20. The light having the specific polarization plane in light emitted from the light modulation device 20 is also measured. The light emission and reflection are conducted by the optical fiber array 10.

(Optical Fiber Array 10)

Figure 2A:
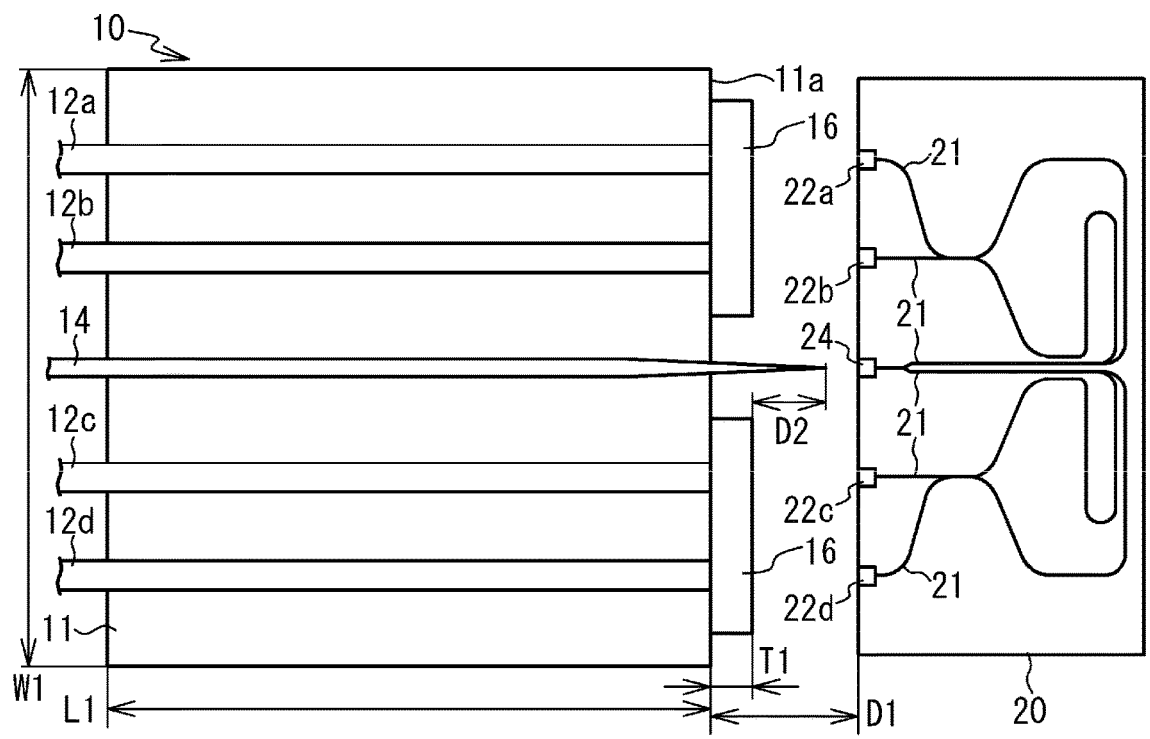
FIG. 2A is a plan view of examples of an optical fiber array and a light modulation device.
Figure 2B:
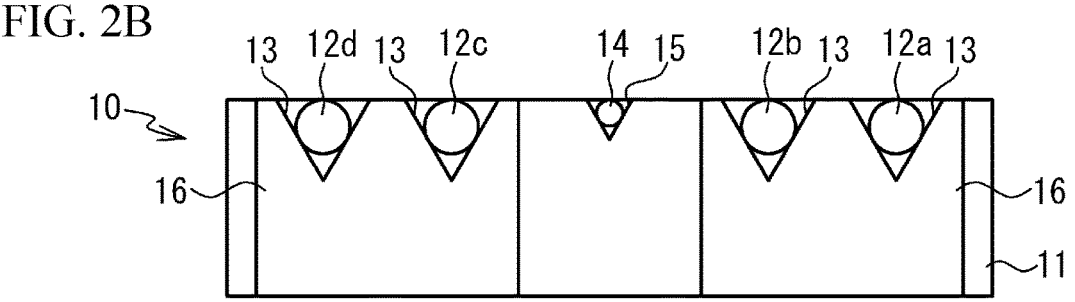
FIG. 2B is a front view of the example of the optical fiber array.

FIG. 2A is a plan view of examples of the optical fiber array 10 and the light modulation device 20. FIG. 2B is a front view of the example of the optical fiber array 10. As shown in FIG. 2A, the optical fiber array 10 and the light modulation device 20 face each other. The optical fiber array 10 includes a base plate 11 (a support), optical fibers 12a through 12d, and an optical fiber 14. The length L1 of the base plate 11 is not smaller than 3 mm and not greater than 30 mm, for example. The width W1 is not smaller than 3 mm and not greater than 8 mm, for example.

As shown in FIG. 2B, four V-shaped grooves 13 and one V-shaped groove 15 are formed in the upper surface of the base plate 11. The grooves 13 and 15 extend in the same direction. One of the optical fibers 12a through 12d is disposed in one groove 13. The optical fiber 14 is disposed in the groove 15. The optical fiber 14 is located near the center of the base plate 11. The optical fibers 12a and 12b are disposed on one side of the optical fiber 14, and the optical fibers 12c and 12d are disposed on the other side. The optical fibers 12a through 12d and the optical fiber 14 extend in the same direction.

The optical fibers 12a through 12d are multimode fibers (MMFs). The optical fiber 14 is a single-mode fiber (SMF), and is also a lensed fiber having its tip processed into a protruding form. The core diameter of the optical fibers 12a through 12d is greater than the core diameter of the optical fiber 14, and is 400 μm, for example. The core diameter of the optical fiber 14 is 8 μm, for example, and the outer diameter of the glass portion is 125 μm.

As shown in FIG. 2A, a surface 11a of the base plate 11 of the optical fiber array 10 faces the light modulation device 20. The distance D1 between the surface 11a and the light modulation device 20 is 0.4 mm, for example, or may be not shorter than 50 μm and not longer than 0.5 mm.

The end faces of the optical fibers 12a through 12d are located in the same plane as the surface 11a. Two polarizing plates 16 are attached to the surface 11a. One polarizing plate 16 covers the optical fibers 12a and 12b, and the other polarizing plate 16 covers the optical fibers 12c and 12d. The thickness T1 of each polarizing plate 16 is 0.2 mm, for example, or may be not smaller than 100 μm and not greater than 400 μm. Meanwhile, the end face of the optical fiber 14 is not covered with either of the polarizing plates 16, but protrudes from the surface 11a toward the light modulation device 20. The distance D2 between the tip of the optical fiber 14 and each polarizing plate 16 is 0.1 mm, for example, or may be not shorter than 100 μm and not longer than 300 μm. To prevent contact between the tip of the optical fiber 14 and the light modulation device 20, the distance D1 between the surface 11a and the light modulation device 20 is preferably not shorter than 0.2 mm and not longer than 0.5 mm, for example.

(Light Modulation Device 20)

The light modulation device 20 is a Mach-Zehnder modulator formed with a GaAs semiconductor or an InP semiconductor, for example. As shown in FIG. 2A, the light modulation device 20 includes optical waveguides 21, as well as electrodes (not shown). The optical waveguides 21 join, branch, and bend. It should be noted that the optical waveguides 21 are not shown in FIG. 1.

An inlet port 24 and four outlet ports 22a through 22d are provided on the surface of the light modulation device 20 facing the optical fiber array 10. The inlet port 24 and the outlet ports 22a through 22d are connected to the optical waveguides 21. The inlet port 24 faces the optical fiber 14. The outlet ports 22a through 22d face the optical fibers 12a through 12d, respectively. The distance between adjacent outlet ports is 0.7 mm, for example. The distance from the outlet ports 22b and 22c to the inlet port 24 is 1 mm, for example.

Laser light is made to enter the inlet port 24 of the light modulation device 20 from the single-mode optical fiber 14 having polarization maintaining characteristics. That is, single-mode incident light having a specific polarization plane is made to enter the light modulation device 20.

To reduce incident light coupling loss, the optical fiber 14 is formed with a lensed fiber, and its tip is designed to protrude from the surface 11a of the base plate 11 toward the light modulation device 20. If the light modulation device 20 tilts to the optical fiber array 10, there is a possibility that the light modulation device 20 will come into contact with the polarizing plates 16, and be damaged. The distance D2 between the tip of the optical fiber 14 and the polarizing plates 16 is set at 0.1 mm, for example, so that contact can be prevented even when the tilt angle is 3 degrees.

Laser light propagates in the optical waveguides 21. When voltage is applied to the electrodes (not shown), the laser light is subjected to quadrature phase shift keying (QPSK), for example. The emitted light subjected to the modulation enters the optical fibers 12a through 12d via the polarizing plates 16. Thus, it is possible to extract emitted light having a certain polarization plane such as a TE direction, for example. The optical fibers 12a through 12d might be bent in the optical measurement device 100 as shown in FIG. 1. To maintain the polarization plane in a desired direction in the bent optical fibers 12a through 12d, the polarizing plates 16 are provided on the surface 11a, and emitted light is made to enter the polarizing plates 16 before entering the optical fibers 12a through 12d. To insert the polarizing plates 16, a space is kept between the surface 11a and the light modulation device 20.

The distance D1 between the optical fiber array 10 and the light modulation device 20 is increased to several millimeters, for example, so that thick polarizing plates can be inserted in the space. However, light emitted from the light modulation device 20 spreads once released into a space from the outlet ports 22a through 22d. The amount of light that is not received by the optical fibers 12a through 12d becomes larger, resulting in an increase in coupling loss. Emitted light also spreads in the polarizing plates 16, resulting in an increase in coupling loss. To shorten the distance D1 and reduce coupling loss, the polarizing plates 16 are preferably film-type plates of approximately 0.2 mm in thickness.

Further, the multimode optical fibers 12a through 12d having a greater core diameter than that of the optical fiber 14 are used, so that most of the emitted light spreading in the space of the distance D1 can be received, and coupling loss can be reduced.

Figure 3A:
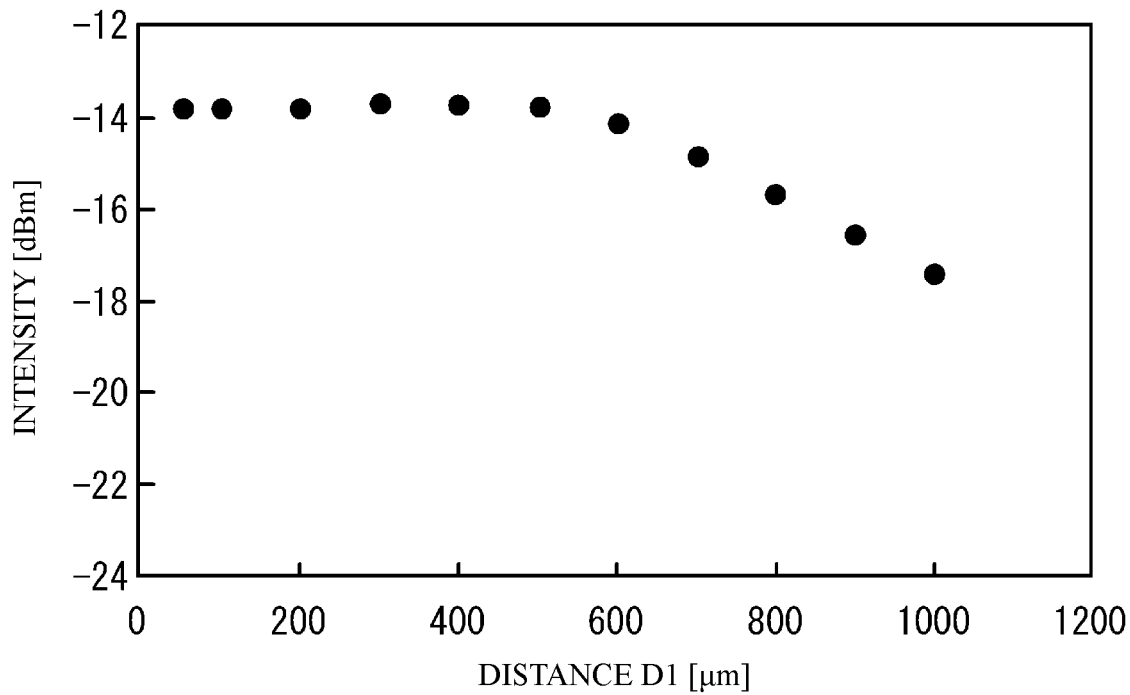
FIG. 3A is a graph showing the relationship between distance D1 and light intensity.

Experiments were conducted to examine the distance D1 and the core diameter of the optical fibers 12a through 12d. FIG. 3A is a graph showing the relationship between the distance D1 and light intensity. The abscissa axis indicates the distance D1, and the ordinate axis indicates the intensity of light received by one of the optical fibers 12a through 12d. The core diameter of the optical fibers is 400 µm. As shown in FIG. 3A, the intensity stays in the neighborhood of −14 dBm when the distance D1 is 500 µm or shorter, but the intensity becomes lower as the distance D1 increases from 500 µm. The distance D1 is preferably not shorter than 50 µm and not longer than 400 µm so that light with higher intensity can be received.

Figure 3B:
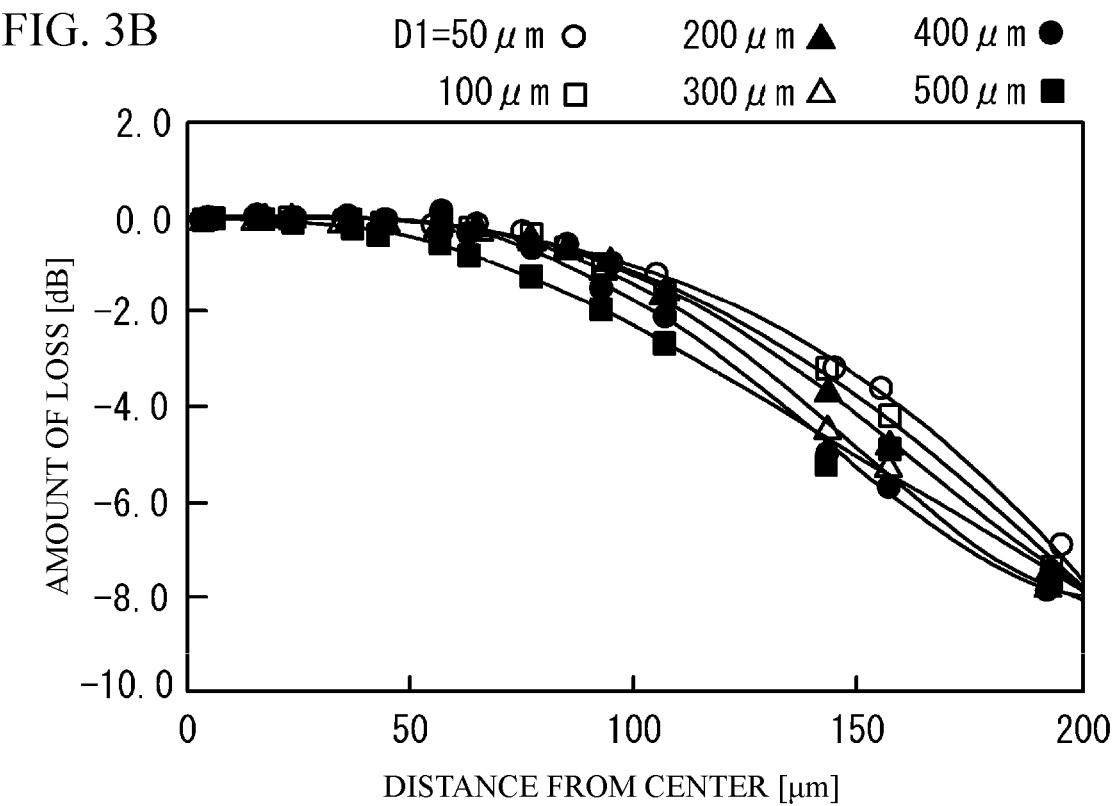
FIG. 3B is a graph showing the relationship between the distance from the center of an optical fiber and coupling loss.

FIG. 3B is a graph showing the relationship between the distance from the center of an optical fiber and coupling loss. The abscissa axis indicates the distance from the center in a radial direction. The ordinate axis indicates the amount of loss, and the decrease from the peak power. The white circle and the white square represent an example in which the distance D1 is 50 µm, and an example in which the distance D1 is 100 µm, respectively. The black triangle and the white triangle represent an example in which the distance D1 is 200 µm, and an example in which the distance D1 is 300 µm, respectively. The black circle and the black square represent an example in which the distance D1 is 400 µm, and an example in which the distance D1 is 500 µm, respectively. The core diameter of the optical fiber is 400 µm. As the distance from the center of the optical fiber becomes longer, the amount of loss becomes larger. If the distance D1 is 400 µm or shorter, for example, the distance from the center should be 60 µm or shorter so that the amount of loss becomes −0.2 dB or smaller. That is, the error in the alignment of the optical fibers in the optical fiber array 10, or in the alignment of the optical fiber array 10 and the light modulation device 20, is approximately 60 µm.

Next, the other components of the optical measurement device 100 shown in FIG. 1 are described. The control device 60 is a computer such as a personal computer (PC), and is electrically connected to the temperature controller 50, the aligning controller 52, the wavelength-tunable laser source 54, the four optical power meters 56, and the current/voltage supply 58.

As shown in FIG. 1, a folder 32 is provided on the aligning stage 30, and the optical fiber array 10 is mounted on the folder 32. One end face of the optical fiber array 10 is brought into contact with a jig 34. A retainer 36 shown in FIG. 1 presses a cover 18 from above, to secure the optical fibers. The jig 34 and the retainer 36 are made of Teflon (registered trademark), for example.

The aligning stage 30 is electrically connected to the aligning controller 52. Using the control device 60, the operator controls the aligning controller 52, to adjust the position of the optical fiber array 10 on the aligning stage 30. The aligning stage 30 and the angle adjustment stage 42 described later function as a distance adjusting unit that adjusts the distance D1.

The optical fiber array 10 includes the four optical fibers 12a through 12d and the optical fiber 14, as shown in FIGS. 2A and 2B. One end of the optical fiber 14 faces the light modulation device 20, and the other end is optically connected to the wavelength-tunable laser source 54 by a connector 53. The glass of the optical fiber 14 is coated, and the outer diameter including the coating is 250 µm, for example. Single-wavelength and single-mode laser light within the range of 1.53 µm to 1.57 µm, for example, propagates in the optical fiber 14.

One end of each of the optical fibers 12a through 12d faces the light modulation device 20, and the other end is optically connected to an optical power meter 56 (an intensity measuring unit) by a connector 55. The length of each of the optical fibers 12a through 12d is 730 µm, for example, and the bend radius is 47 mm, for example.

Laser light emitted from the wavelength-tunable laser source 54 enters the light modulation device 20 through the optical fiber 14. The light modulation device 20 modulates the laser light. The modulated laser light enters the respective optical power meters 56 through the optical fibers 12a through 12d. The control device 60 controls the wavelength of the laser light to be emitted from the wavelength-tunable laser source 54, and acquires the light intensities measured by the optical power meters 56.

The temperature adjustment stage 40 is mounted on the angle adjustment stage 42, and the light modulation device 20 is mounted on the temperature adjustment stage 40. The temperature adjustment stage 40 includes a Peltier device and the like, for example, and is electrically connected to the temperature controller 50. Using the control device 60, the operator controls the electric power to be applied from the temperature controller 50 to the temperature adjustment stage 40. In this manner, the temperature of the light modulation device 20 on the temperature adjustment stage 40 is adjusted.

The light modulation device 20 is electrically connected to a multicontact probe 41 via bonding wires 43. The multicontact probe 41 faces two sides of the light modulation device 20, and is electrically connected to the current/voltage supply 58.

The current/voltage supply 58 is a multichannel direct-current power supply, and applies voltage to electrodes of the light modulation device 20 via the multicontact probe 41. The current/voltage supply 58 can also measure the currents in the electrodes. The operator controls the current/voltage supply 58 through the control device 60, to apply a reverse bias voltage to the light modulation device 20 and check the current flowing in the light modulation device 20.

The camera 44 is disposed so that the surface of the light modulation device 20 facing the optical fiber array 10 can be included in the field of view. The monitor 46 is connected to the camera 44, and displays a video image captured by the camera 44. The monitor 46 also displays a reference line that is the reference for positioning of the light modulation device 20.

(Evaluation of the Light Modulation Device 20)

While looking at the image on the monitor 46, the operator operates a micrometer of the angle adjustment stage 42 so that the end face of the light modulation device 20 is adjusted to the reference line on the monitor 46. The multicontact probe 41 is brought into contact with the electrodes (not shown) of the light modulation device 20. Using the current/voltage supply 58, the operator applies a reverse bias voltage of −5 V to the light modulation device 20, for example. If the current is equal to or higher than a prescribed value, the current/voltage supply 58 is turned off. If the current is lower than the prescribed value, the positioning of the multicontact probe 41 and the like are performed until a current equal to or higher than the prescribed value is obtained.

The position of the optical fiber array 10 is moved with the aligning stage 30, so that the tip of the optical fiber 14 is moved to a position at 50 μm, for example, from the inlet port 24 of the light modulation device 20. The wavelength-tunable laser source 54 is driven, so that single-wavelength laser light within the range of 1.53 μm to 1.57 μm, for example, enters the light modulation device 20. Light emitted from the light modulation device 20 enters the optical power meters 56 through the optical fibers 12a through 12d. The position of the optical fiber array 10 is adjusted with the aligning stage 30 so that the powers indicated by the optical power meters 56 are maximized.

A measurement program is executed, so that the current/voltage supply 58 scans the reverse bias voltage from −11 V to −5 V, for example, and the intensity of light emitted from the light modulation device 20 is measured. In this manner, the light modulation device 20 is evaluated. After the end of the evaluation, the wavelength-tunable laser source 54 and the current/voltage supply 58 are turned off. The optical fiber array 10 and the multicontact probe 41 are moved away from the light modulation device 20, and the light modulation device 20 is detached from the temperature adjustment stage 40.

According to the first embodiment, the optical fiber 14 of the optical fiber array 10 is a single-mode optical fiber having polarization maintaining characteristics. Thus, single-mode laser light having a specific polarization plane can be made to propagate through the optical fiber 14. The optical fibers 12a through 12d are multimode fibers, and the polarizing palates 16 cover the optical fibers 12a through 12d. Thus, laser light polarized by the polarizing plates 16 can be received and transferred by the optical fibers 12a through 12d.

To reduce the size of the light modulation device 20, the inlet port 24 and the outlet ports 22a through 22d are aligned on one end face of the light modulation device 20. The end faces of the optical fibers 12a through 12d and 14 are located on the side of the surface 11a of the optical fiber array 10. In this arrangement, the surface 11a is made to face the inlet port 24 and the outlet ports 22a through 22d, so that light can be made to enter and exit the light modulation device 20, with the use of the optical fiber array 10.

For example, as the optical fiber array 10 is used in the optical measurement device 100, single-mode laser light having a specific polarization plane can be made to enter the light modulation device 20 from the optical fiber 14, and emitted light having the specific polarization plane can be made to propagate from the light modulation device 20 to the optical power meters 56 through the optical fibers 12a through 12d. As the distance D1 is adjusted while intensities are measured with the optical power meters 56, it becomes possible to dispose the light modulation device 20 at an appropriate position and evaluate the light modulation device 20.

At the outlet ports 22a through 22d of the light modulation device 20, the mode diameter of emitted light is approximately 1.5 μm, for example, but becomes greater once the emitted light exits the outlet ports 22a through 22d. Further, to dispose the polarizing plates 16 between the optical fiber array 10 and the light modulation device 20, the optical fiber array 10 and the light modulation device 20 are separated by the distance D1 from each other. The emitted light spreads while travelling the distance D1. To reduce coupling loss, light is received by the multimode optical fibers 12a through 12d having a large core diameter. For example, the core diameter of the optical fibers 12a through 12d is preferably not smaller than 100 μm and not greater than 500 μm.

The end faces of the optical fibers 12a through 12d are located in the same plane as the surface 11a of the base plate 11. The optical fibers 12a through 12d can be made closer to the light modulation device 20, and the polarizing plates 16 can be attached to the optical fibers 12a through 12d. With this arrangement, coupling loss of laser light entering from the surface 11a can be reduced, and the polarized state can be changed.

The distance D1 between the optical fiber array 10 and the light modulation device 20 is 400 μm or shorter, for example, and the polarizing plates 16 can be disposed in a space of a length equal to D1. Therefore, the thickness of the polarizing plates 16 is not smaller than 100 μm and not greater than 400 μm, for example. The polarizing plates 16 may pass light polarized in a TE direction, or may pass light polarized in some other direction.

The optical fiber 14 is a lensed fiber, and laser light is gathered at the tip of the optical fiber 14. Further, as the end face of the optical fiber 14 protrudes outward from the surface 11a, laser light coupling loss is reduced. Lens processing is performed on the tip of the optical fiber 14, so that, in a case where light of 8 μm in mode diameter enters the optical fiber 14, the mode diameter becomes approximately 3 μm at the tip, for example.

The light modulation device 20 has the inlet port 24 near its center, has the outlet ports 22a and 22b on one side of the inlet port 24, and has the outlet ports 22c and 22d on the other side of the inlet port 24. In response to that, the optical fiber array 10 has the optical fiber 14 near its center, has the optical fibers 12a and 12b on one side of the optical fiber 14, and has the optical fibers 12c and 12d on the other side of the optical fiber 14. With this arrangement, laser light can be received from and emitted to the light modulation device 20.

The number of the optical fibers may be changed in accordance with the number of the ports of the light modulation device 20. At least two multimode optical fibers are disposed on either side of the optical fiber 14. With this arrangement, more than one ray of light can be received. Further, the optical fibers may have different purposes of use. For example, the optical fibers 12a and 12d are used for monitoring, while the optical fibers 12b and 12c are used for measuring modulated light.

It should be noted that, if the bend radius of the optical fibers 12a through 12d and 14 is increased, laser light leaks from the optical fibers. Therefore, the components of the optical measurement device 100 are arranged so that the bend radius remains small. For example, the bend radius of the optical fibers 12a through 12d is 47 mm or smaller.

What is claimed is:

1. An optical fiber array comprising:
   a support;
   a single-mode optical fiber and a plurality of multimode optical fibers, the single-mode optical fiber and the multimode optical fibers being arranged on the support; and
   a polarizing plate provided on an end face of the support, wherein
   the single-mode optical fiber has polarization maintaining characteristics,
   an end face of the single-mode optical fiber and end faces of the multimode optical fibers face the end face of the support, and
   the polarizing plate covers the end faces of the multimode optical fibers.

2. The optical fiber array according to claim 1, wherein a core diameter of the multimode optical fibers is not smaller than 100 μm and not greater than 500 μm.

3. The optical fiber array according to claim 1, wherein the end faces of the multimode optical fibers are located in a same plane as the end face of the support.

4. The optical fiber array according to claim 1, wherein the single-mode optical fiber is a lensed fiber, and the end face of the single-mode optical fiber protrudes outward from the end face of the support.

5. The optical fiber array according to claim 1, wherein at least two of the multimode optical fibers are disposed on either side of the single-mode optical fiber.

6. The optical fiber array according to claim 1, wherein a thickness of the polarizing plate is not smaller than 100 μm and not greater than 400 μm.

7. An optical measurement device comprising:
   an optical fiber array including
      a support,
      a single-mode optical fiber and a plurality of multimode optical fibers, the single-mode optical fiber and the multimode optical fibers being arranged on the support, and
      a polarizing plate provided on an end face of the support, wherein
      the single-mode optical fiber has polarization maintaining characteristics,
      an end face of the single-mode optical fiber and end faces of the multimode optical fibers face the end face of the support, and
      the polarizing plate covers the end faces of the multimode optical fibers;
   a distance adjusting unit that adjusts a distance between the end face of the optical fiber array and a light modulation device;
   a laser source connected to the single-mode optical fiber of the optical fiber array; and
   an intensity measuring unit that is connected to the multimode optical fibers of the optical fiber array, and measures an intensity of light emitted from the light modulation device, wherein
   laser light emitted from the laser source enters the light modulation device through the single-mode optical fiber, and
   laser light emitted from the light modulation device enters the intensity measuring unit through the polarizing plate and the multimode optical fibers of the optical fiber array.

8. The optical measurement device according to claim 7, wherein a core diameter of the multimode optical fibers is not smaller than 100 μm and not greater than 500 μm.

9. The optical measurement device according to claim 7, wherein the end faces of the multimode optical fibers are located in a same plane as the end face of the support.

10. The optical measurement device according to claim 7, wherein
    the single-mode optical fiber is a lensed fiber, and
    the end face of the single-mode optical fiber protrudes outward from the end face of the support.

11. The optical measurement device according to claim 7, wherein at least two of the multimode optical fibers are disposed on either side of the single-mode optical fiber.

12. The optical measurement device according to claim 7, wherein a thickness of the polarizing plate is not smaller than 100 μm and not greater than 400 μm.

* * * * *